(12) United States Patent
Dombek et al.

(10) Patent No.: US 11,137,062 B2
(45) Date of Patent: Oct. 5, 2021

(54) OIL PIPE COVER AND MECHANICAL REDUCTION GEAR FOR AN AIRCRAFT TURBOMACHINE COMPRISING SUCH A COVER

(71) Applicant: SAFRAN TRANSMISSION SYSTEMS, Colombes (FR)

(72) Inventors: Alexis Claude Michel Dombek, Moissy-Cramayel (FR); Bálint Pap, Moissy-Cramayel (FR)

(73) Assignee: SAFRAN TRANSMISSION SYSTEMS, Colombes (FR)

(*) Notice: Subject to any disclaimer, the term of this patent is extended or adjusted under 35 U.S.C. 154(b) by 0 days.

(21) Appl. No.: 16/922,807

(22) Filed: Jul. 7, 2020

(65) Prior Publication Data
US 2021/0010585 A1   Jan. 14, 2021

(30) Foreign Application Priority Data
Jul. 8, 2019  (FR) ...................................... 1907574

(51) Int. Cl.
| | | |
|---|---|---|
| *F16H 57/04* | (2010.01) | |
| *F02C 7/36* | (2006.01) | |
| *F16H 57/08* | (2006.01) | |

(52) U.S. Cl.
CPC ........... *F16H 57/0427* (2013.01); *F02C 7/36* (2013.01); *F16H 57/0479* (2013.01); *F16H 57/0486* (2013.01); *F16H 57/082* (2013.01); *F05D 2220/323* (2013.01); *F05D 2260/98* (2013.01)

(58) Field of Classification Search
None
See application file for complete search history.

(56) References Cited

U.S. PATENT DOCUMENTS

| | | |
|---|---|---|
| 8,820,478 B2 | 9/2014 | Gauthier et al. |
| 8,876,647 B2 | 11/2014 | Gallet et al. |
| 10,458,279 B2 | 10/2019 | Gedin et al. |
| 2005/0215389 A1 | 9/2005 | Shimizu et al. |

(Continued)

FOREIGN PATENT DOCUMENTS

| | | | |
|---|---|---|---|
| DE | 102011005724 A1 * | 9/2012 | ........... F16D 25/123 |
| EP | 2317181 A1 | 5/2011 | |

(Continued)

OTHER PUBLICATIONS

Rapport De Recherche Preliminaire dated Feb. 28, 2020, for French Application No. 1907574, filed Jul. 8, 2019, 2 pages.

*Primary Examiner* — Timothy Hannon
(74) *Attorney, Agent, or Firm* — Christensen O'Connor Johnson Kindness PLLC (57) ABSTRACT

An oil pipe cover for a mechanical reduction gear of a turbomachine, for example of an aircraft, is configured to be fixed to a planet carrier of the reduction gear and to be mounted on an axial end of a hydrodynamic bearing tubular support of a planet gear of the reduction gear. The oil pipe cover has an annular body extending around an axis (Y) and having a mounting central orifice on the axial end. The body has two diametrically opposed circumferential deflectors: a first deflector having a circumferential oil guiding surface located radially outwards with respect to the axis (Y), and a second deflectors having a circumferential oil guiding surface located radially inwards with respect to the axis (Y).

15 Claims, 5 Drawing Sheets

(56) References Cited

U.S. PATENT DOCUMENTS

| | | | | |
|---|---|---|---|---|
| 2014/0287864 A1* | 9/2014 | Iizuka | ................. | F16H 57/0426 |
| | | | | 475/159 |
| 2015/0292613 A1* | 10/2015 | Tonokura | ............ | F16H 57/0484 |
| | | | | 475/159 |
| 2016/0201568 A1* | 7/2016 | Sheridan | ................... | F02C 7/36 |
| | | | | 415/1 |

FOREIGN PATENT DOCUMENTS

| | | |
|---|---|---|
| FR | 2 987 416 A1 | 8/2013 |
| FR | 3 041 054 A1 | 3/2017 |
| WO | 2010092263 A1 | 8/2010 |

\* cited by examiner

OIL PIPE COVER AND MECHANICAL REDUCTION GEAR FOR AN AIRCRAFT TURBOMACHINE COMPRISING SUCH A COVER

CROSS REFERENCE TO RELATED APPLICATION

This application claims priority under 35 U.S.C. § 119 to French Patent Application No. 1907574, filed Jul. 8, 2019, which is herein incorporated by reference in its entirety.

FIELD

Embodiments of the present disclosure relate to the field of mechanical reduction gear for turbomachines, e.g., for aircraft.

BACKGROUND

The prior art comprises WO-A1-2010/092263, FR-A1-2 987 416, FR-A1-3 041 054, EP-A1-2 317 181 and US-A1-2005/215389, which is herein incorporated by reference in their entirety.

The role of a mechanical reduction gear is to change the speed and torque ratio between the input and output shafts of a rotary drive mechanism.

The new generations of dual-flow turbomachines, in particular those with a high dilution ratio, comprise a mechanical reduction gear to drive the shaft of a fan. Usually, the purpose of the reduction gear is to transform the so-called fast rotation speed of the shaft of a power turbine into a slower rotation speed for the shaft driving the fan.

Such a reduction gear comprises a central pinion, called the sun gear, a ring gear and pinions called the planet gears, which are meshed between the sun gear and the ring gear. The planet gears are held by a frame called a planet carrier. The sun gear, the ring gear and the planet carrier are planetary gears because their axes of revolution coincide with the longitudinal axis X of the turbomachine. The planet gears each have a different axis of revolution Y, they are equally distributed on the same operating diameter around the axis of the planetary gears. These axes Y are parallel to the longitudinal axis X.

There are several reduction gear architectures. In the prior art of dual-flow turbomachines, the reduction gears are of the planetary or epicyclic type. There are also so-called differential or "compound" architectures.

On a planetary reduction gear, the planet carrier is fixed and the ring gear constitutes the output shaft of the device which rotates in the opposite direction to that of the sun gear.

On an epicyclic reduction gear, the ring gear is fixed and the planet carrier constitutes the output shaft of the device which rotates in the same direction as the sun gear.

On a differential reduction gear, no element is fixed in rotation. The ring gear rotates in the opposite direction to that of the sun gear and that of the planet carrier.

The reduction gears can comprise one or more meshing stages. This meshing is achieved in different ways such as by contact, by friction or even by magnetic fields. There are several types of contact meshing, such as straight or herringbone toothings.

A reduction gear must be lubricated and the supply of lubricating oil to the rotating components of a reduction gear can be problematic. The oil is usually supplied to the reduction gear via a lubricating oil distributor.

The planet gears are guided in rotation by bearings which are lubricated. The bearings may consist of rolling elements (ball bearings, roller bearings, tapered roller bearings, etc.) or may be hydrodynamic bearings. In the latter case, each planet gear is rotatably mounted on and around a tubular support of the planet carrier, which is supplied with oil and which is configured to form an oil film between the outer periphery of the support and the inner periphery of the planet gear. For this purpose, in the current technique, each planet gear comprises an internal cylindrical surface which extends around an external cylindrical surface of the support and which delimits with the latter an annular space for the formation of the oil film. This space is supplied with oil by oil conveying pipes which are formed in the support and extend from the outer cylindrical surface to an internal cavity of the support which is supplied with oil by the aforementioned distributor.

This disclosure relates to a reduction gear, the planet gears of which are guided by hydrodynamic bearings.

However, there are problems with the current technology:

In a hydrodynamic or plain bearing, the oil heats up due to the oil shear in a non-negligible way. The warmer oil is located in an oil wedge close to the axis of the engine. This hot oil is thrown out of the bearing axially and is then redirected to the outer radius of the reduction gear due to the centrifugal effect. This oil touches the solid components (the tubular supports, the planet gears, and the ring gear) of the reduction gear and heats by convection heat transfer these solid components;

this heating is penalizing because the hotter tubular supports will heat up the oil in the enclosure of the bearing;

the hotter supports will heat the oil in the internal cavities of these supports, which are supplied with oil, which will reduce the viscosity of the oil, increase the eccentricity of the bearing, and result in oil friction losses of the bearing;

the heating of the solid components of the reduction gear generates higher friction losses in the bearings and increases the possibility of the seizure between the ring gear and the planet gears.

The present disclosure provides a simple, effective and economical improvement for improving the flow and discharge of the oil in a turbomachine mechanical reduction gear.

SUMMARY

The present disclosure relates to examples of an oil pipe cover for a mechanical reduction gear of a turbomachine, in particular for an aircraft. In an embodiment, the cover is configured to be fixed to a planet carrier of the reduction gear and to be mounted on an axial end of a tubular support for a hydrodynamic bearing of a planet gear of the reduction gear. The cover comprises an annular body extending around an axis and comprising a mounting central orifice on the axial end. In one or more embodiments, the body comprises one or more of the following in any combination:

a first circumferential deflector having a first predetermined circumferential extent around the axis, this first deflector comprising a circumferential oil guiding surface located radially outwards with respect to the axis, a second circumferential deflector having a second predetermined circumferential extent around the axis, this second deflector comprising a circumferential oil guiding surface located radially inwards with respect to the axis, the first and second deflectors being substantially diametrically opposed with respect to the axis, and oil discharge pipes which pass substantially axially through the body and which are diametrically opposed with respect to the first deflector, these pipes opening axially on the side of the second deflector, radially inside the latter with respect to the axis.

The solution proposed in the present disclosure is a modification of the two covers of the bearing or of the planet carrier in order to channel the hot oil coming from the bearing to the outside of the reduction gear in order to avoid convective heating of the components of the reduction gear. The modifications comprise at least oil discharge pipes and two deflectors per cover. One of the deflectors is intended to be located facing the oil wedge so as to prevent the hot oil from heating the tubular support. This hot oil is then centrifugally carried to the second deflector, which serves to prevent the hot oil from escaping from the reduction gear and heating the planet gear. The hot oil in the second deflector is then discharged through the pipes. This solution prevents the heating of components of the epicyclic reduction gear due to the hot oil of the bearing, and at the same time allows the cold oil supplying the tubular support to flow out freely at the periphery of the support in view of the formation of the hydrodynamic oil film.

The solutions proposed herein are compatible with an epicyclic reduction gear, the ring gear of which is fixed in the engine's frame. The solutions are compatible with any type of toothing (straight, herringbone), any type of planet carrier, whether monobloc or cage-carrier type.

The cover according to one or more embodiments of the present disclosure may comprise one or more of the following features, taken in isolation from each other, or in combination with each other:
  each of the first and second circumferential extents is between 160 and 360°, and for example between approximately 160 and 200°,
  the first deflector comprises circumferential ends close to the circumferential ends of the second deflector so that oil flowing on the guiding surface of the first deflector can then flow onto the guiding surface of the second deflector,
  the first deflector has a generally flared shape (e.g. conical or biconical but other shapes are possible) on the side opposite the body and/or the second deflector has a generally flared shape (e.g. conical or biconical but other shapes are possible) on the side of the body,
  the first deflector comprises, at a free end located on the side opposite to the body, a circumferential edge oriented radially outwards with respect to the axis; this edge is optional,
  the body comprises an oil accumulating circumferential tub, this tub being diametrically opposed with respect to the second deflector and opening on the side of the first deflector, radially outside the latter,
  the second deflector comprises, at a free end located on the side opposite to the body, a circumferential edge oriented on the side opposite to the body; this edge is optional,
  the tub has a circumferential extent around the axis of the support which is less than or equal to 360°, e.g. between 90 and 180°,
  the tub has in axial section a generally triangular or rectangular or circular shape, the base of which located radially outwards and the apex of which is located radially inwards, with respect to the axis of the support,
  the first and second deflectors and the oil discharge pipes are formed in a single piece.

This present disclosure also relates to examples of a mechanical reduction gear of a turbomachine, in particular for an aircraft. In an embodiment, the reduction gear comprises:
  a sun gear having an axis of rotation,
  a ring gear which extends around the sun gear and which is configured to be immobile in rotation around the axis,
  planet gears which are meshed with the sun gear and the ring gear and which are held by a planet carrier which is configured to be rotatable around the axis, each of the planet gears being guided in rotation by a hydrodynamic bearing comprising (or formed by) a tubular support around which the planet gear is rotatably mounted, each of the tubular supports comprising a first annular groove located at a first axial end of the support, and a second annular groove located at a second opposite end of the support, the first and second grooves being oriented axially in opposite directions,
  a lubricating oil distributor which is configured to supply oil to internal cavities of the tubular supports, each of the tubular supports having oil conveying pipes from its internal cavity to its outer periphery for forming an oil film between the support and the planet gear.

In some embodiments, each of the tubular supports is fixed to the planet carrier via two covers which are each defined according to any one of the particularity of the present disclosure and which are respectively and coaxially mounted on the axial ends of the tubular support, the cover mounted on the first axial end of the support having its deflectors which are axially engaged in the first groove, and the cover mounted on the second axial end of the support having its deflectors which are axially engaged in the second groove.

The reduction gear according to one or more embodiments of the present disclosure may comprise one or more of the following features, taken in isolation from each other, or in combination with each other:
  the conveying pipes are substantially located in the same plane passing through the axis of the support,
  the plane passes substantially at the level of the discharge pipes,
  the conveying pipes open into the same groove formed in an external cylindrical surface of the support,
  the discharge pipes open axially on the side of the second deflector at the first or second groove of the support,
  the pipes have a cylindrical, rectangular, porthole shaped, etc.

The present disclosure furthermore relates to a turbomachine, in particular for aircraft, comprising a mechanical reduction gear as described above.

DESCRIPTION OF THE DRAWINGS

The foregoing aspects and many of the attendant advantages of the present disclosure will become more readily appreciated as the same become better understood by reference to the following detailed description, when taken in conjunction with the accompanying drawings, wherein.

DETAILED DESCRIPTION

Figure 1:
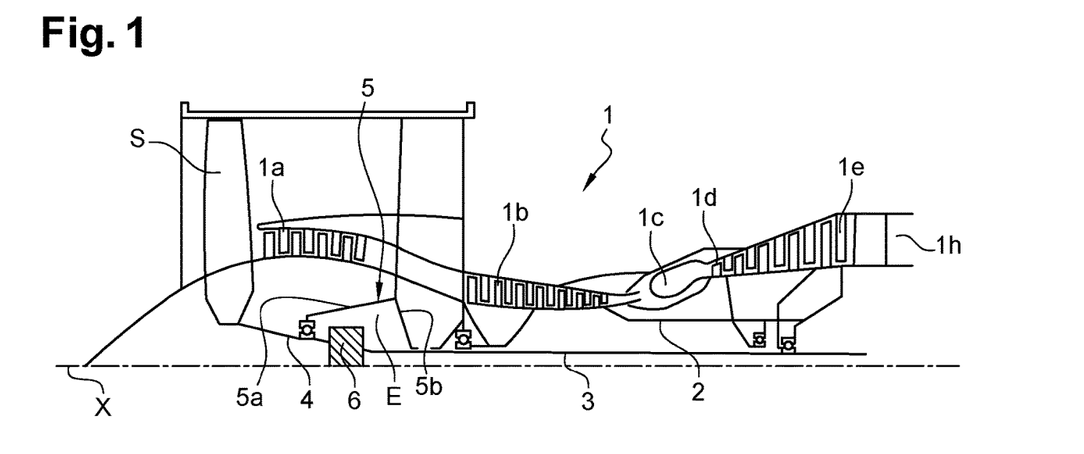
FIG. 1 is a schematic axial cross-sectional view of a turbomachine in accordance with a representative embodiment of the present disclosure.

FIG. 1 describes a representative and non-limiting turbomachine 1 which comprises a fan S, a low-pressure compressor 1a, a high-pressure compressor 1b, an annular combustion chamber 1c, a high-pressure turbine 1d, a low-pressure turbine 1e and an exhaust nozzle 1h. The high-pressure compressor 1b and the high-pressure turbine 1d are connected by a high-pressure shaft 2 and form a high-pressure (HP) body with it. The low-pressure compressor 1a and the low-pressure turbine 1e are connected by a low-pressure shaft 3 and form a low-pressure body (LP) with it.

The fan S is driven by a fan shaft 4 which is driven by the LP shaft 3 by a reduction gear 6. This reduction gear 6 is usually of the planetary or epicyclic type.

The following description refers to a reduction gear of the epicyclic type, in which the planet carrier and the sun gear are movable in rotation, the ring gear of the reduction gear being fixed in the frame of the engine.

The reduction gear 6 is positioned in the upstream part of the turbomachine. In this patent application, the terms upstream and downstream refer to the general direction of gas flow in the turbomachine, along its axis of extension or rotation of its rotors. A fixed structure comprising schematically, here, an upstream part 5a and a downstream part 5b which makes up the engine casing or stator 5 is arranged so as to form an enclosure E surrounding the reduction gear 6. This enclosure E is herein closed upstream by seals at the level of a bearing allowing the passage of the fan shaft 4, and downstream by seals at the level of the LP shaft 3.

Figure 2:
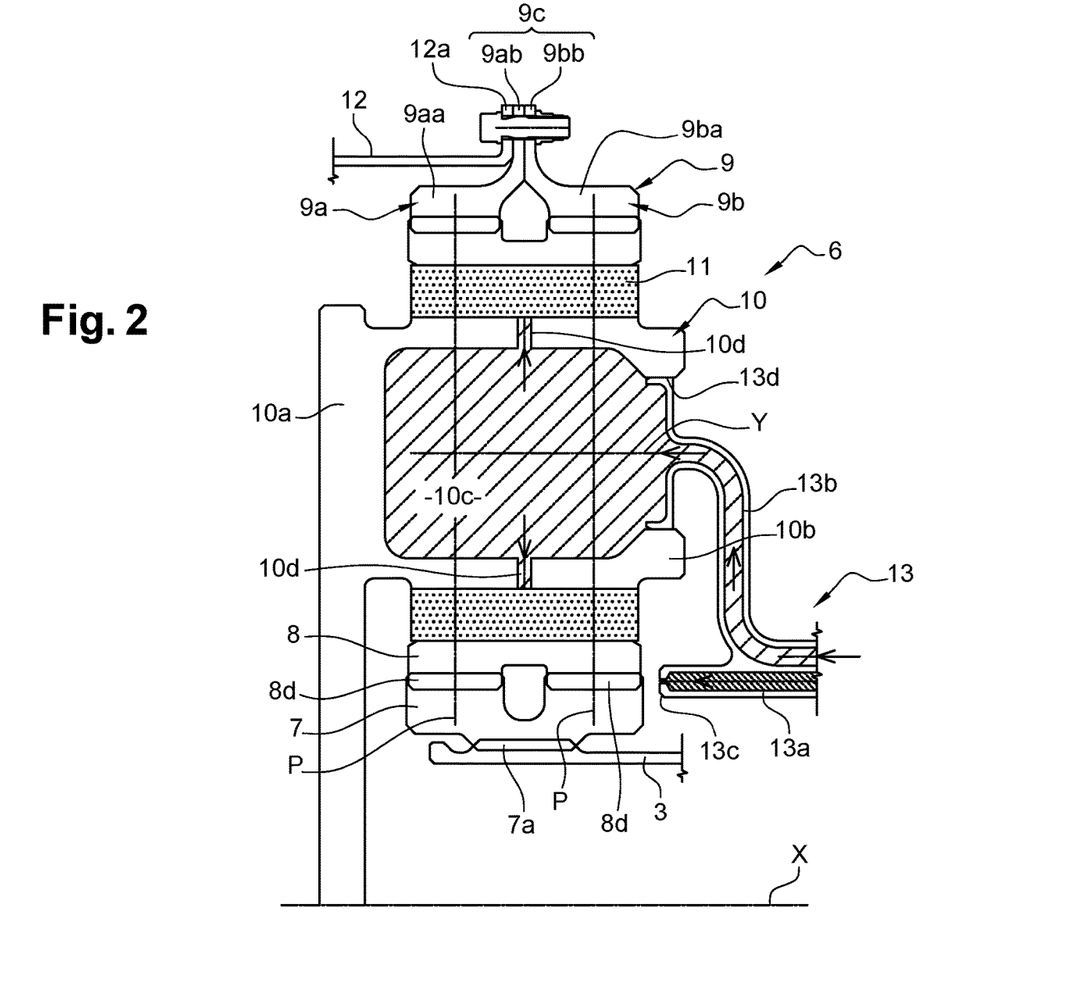
FIG. 2 is a partial axial cross-sectional view of a mechanical reduction gear.

FIG. 2 shows an epicyclic reduction gear 6. On the input side, the reduction gear 6 is connected to the LP shaft 3, e.g. via internal splines 7a. In this way, the LP shaft 3 drives a planetary pinion called the sun gear 7. Classically, the sun gear 7, whose axis of rotation is combined with that of the turbomachine X, drives a series of pinions called planet gears 8, which are equally distributed on the same diameter around the axis of rotation X. This diameter is equal to twice the operating center distance between the sun gear 7 and the planet gears 8. The number of planet gears 8 is generally defined between three and seven for this type of application.

All planet gears 8 are held by a frame called planet carrier 10. Each planet gear 8 rotates around its own axis Y and meshes with the ring gear 9.

On the output side there is:

In this epicyclic configuration, all planet gears 8 drives the planet carrier 10 around the axis X of the turbomachine.

The ring gear is fixed to the engine casing or stator 5 via a ring gear carrier 12 and the planet carrier 10 is fixed to the fan shaft 4.

In another planetary configuration, all planet gears 8 are held by a planet carrier 10 which is attached to the engine casing or stator 5. Each planet gear drives the ring gear which is attached to the fan shaft 4 via a ring gear carrier 12.

Each planet gear 8 is mounted freely in rotation by a bearing 11, e.g., of the rolling bearing or hydrodynamic bearing type. Each bearing 11 is provided on one of the tubular supports 10b of the planet carrier 10 and all the supports are positioned relative to each other by one or more structural frames 10a of the planet carrier 10. There is a number of tubular supports 10b and bearings 11 equal to the number of planet gears. For operational, mounting, manufacturing, control, repair or replacement reasons, the supports 10b and the frame 10a can be separated into several parts.

For the same reasons as mentioned above, the toothing of a reduction gear can be separated into several helixes, each having a median plane P. In our example, we detail the operation of a reduction gear with several helixes with one ring gear separated into two half-ring gears:

An upstream half-ring gear 9a consisting of a rim 9aa and a fastening half-flange 9ab. On the rim 9aa is located the upstream helix of the toothing of the reduction gear. This upstream helix meshes with that of the planet gear 8 which meshes with that of the sun gear 7.

A downstream half-ring gear 9b consists of an edge 9ba and a mounting half-flange 9bb. On the edge 9ba is located the downstream helix of the toothing of the reduction gear. This downstream helix meshes with that of the planet gear 8 which meshes with that of the sun gear 7.

If the widths of helixes vary between the sun gear 7, the planet gears 8 and the ring gear 9 because of toothing overlaps, they are all centered on a median plane P for the upstream helixes and on another median plane P for the downstream helixes. In the case of a double row roller bearing, each row of rolling elements is also preferably, but not necessarily, centered on two median planes.

The fastening half-flange 9ab of the upstream ring gear 9a and the fastening half-flange 9bb of the downstream ring gear 9b form the fastening flange 9c of the ring gear. The ring gear 9 is fixed to a ring gear carrier by assembling the fastening flange 9c of the ring gear and the fastening flange 12a of the ring gear carrier using a bolted assembly for example.

The arrows in FIG. 2 describe the oil flow in the reduction gear 6. The oil enters the reduction gear 6 from the stator part 5 into a distributor 13 by different means which will not be specified in this view as they are specific to one or more types of architecture. The distributor 13 comprises injectors 13a and arms 13b. The function of the injectors 13a is to lubricate the toothings and the function of the arms 13b is to lubricate the bearings. The oil is fed to the injector 13a to exit through the end 13c to lubricate the toothings. The oil is also fed to arm 13b and flows through the supply port 13d of the bearing 11. The oil then flows through the support 10b into one or more cavities 10c to exit through pipes 10d to lubricate the bearings of the planet gears.

FIGS. 3 to 7 illustrate a representative and non-limiting embodiment of the mechanical reduction gear 6 according to the present disclosure.

The above description applies to this reduction gear 6 insofar as it is technically compatible with the following.

Figure 3:
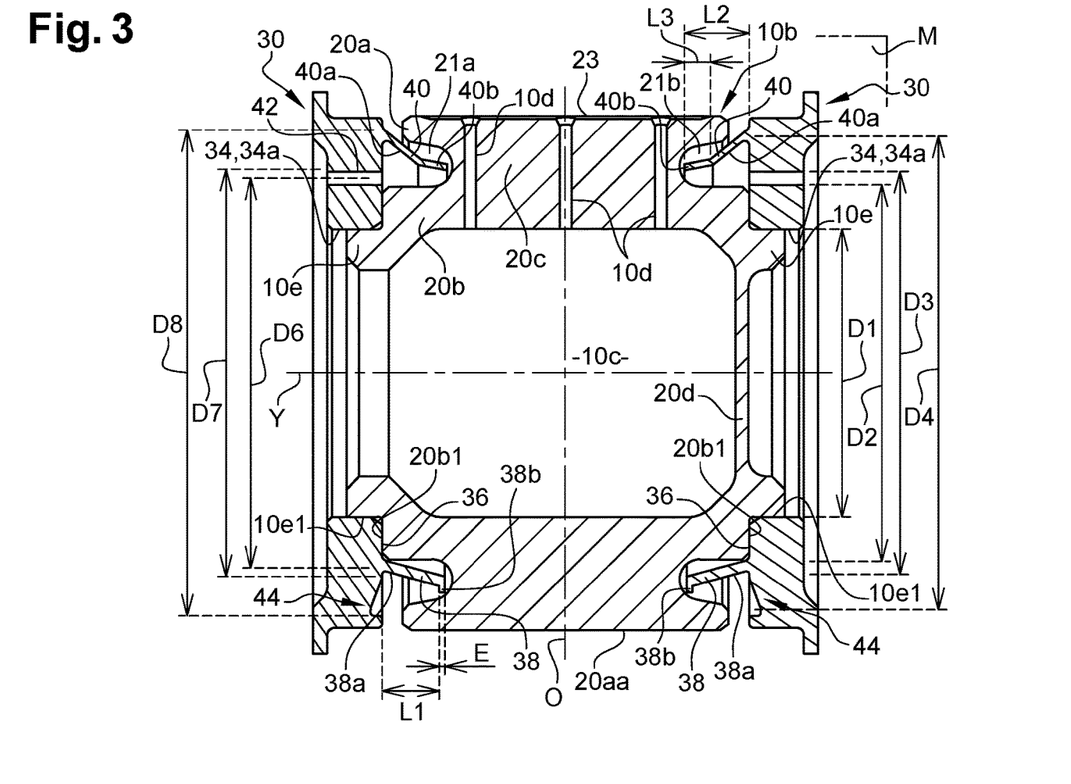
FIG. 3 is an axial cross-sectional of a tubular support and covers for a mechanical reduction gear in accordance with a representative embodiment of the present disclosure.

The tubular support 10b of each planet gear 8 comprises a one-piece body in the example shown which comprises two coaxial annular walls 20a, 20b which extend one around the other and which are connected to each other by an annular web 20c.

The inner annular wall 20b is closed at one end by a bulkhead 20d and has an axial end open on the opposite side to receive oil supplied by the oil distributor (not shown). The inner wall 20b thus defines the cavity 10c for receiving lubricating oil.

The outer annular wall 20a has an axial length or dimension measured along the axis Y which is close to (e.g., within 10%) that of the wall 20b. The wall 20a comprises an outer cylindrical surface 20aa which is configured to delimit with an inner cylindrical surface (not visible) of the bearing an annular oil-receiving and oil-film-forming space for the formation of a hydrodynamic bearing.

The web 20c has a shorter length measured in the same way, so that the axial ends of the walls 20a, 20b delimit between them annular grooves 21a, 21b. This configuration provides a certain flexibility to the support 10b at the level of each of its axial ends.

The support 10b thus comprises a first annular groove 21a located on one side and the opening of which opens in the axial direction, and a second annular groove 21b located on the opposite side and the opening of which opens axially on the side opposite to the groove 21a. These grooves 21a, 21b are generally U-shaped in cross-section.

The support 10b comprises lubricating oil conveying pipes 10d for conveying lubricating oil from the cavity 10c to the outer periphery of the support 10b. In the example shown, there are three such pipes 10d, although this number is not restrictive. They each have a generally elongated and cylindrical shape. They are aligned and evenly spaced in a plane M passing through the axis Y of the support 10b, which is the plane of the drawing in FIG. 3.

The radially outer ends of the pipes 10d open in the same groove 23 formed on the outer surface 20aa of the support 10b. This groove 23 has a generally elongated shape and extends substantially in the plane M. The radially inner ends of the pipes 10d open into the cavity 10c.

At each of its axial ends, the support 10b comprises a cylindrical edge 10e for mounting a cover 30. The edges 10e extend around the axis Y. They are located on the inner wall 20b and extend axially in opposite directions.

Each edge 10e comprises an outer cylindrical surface 10e1 for mounting the corresponding cover 30 and which is connected to a radial annular surface 20b1 of the inner wall 20b. The edge 10e which is located at the level of the bulkhead 20d extends protruding therefrom.

In the example shown, the covers 30 have the dual function of fixing the tubular support 10b to the planet carrier 10 (shown in FIG. 7) and oil supply pipe of the hydrodynamic bearing comprising (formed by) the support 10b.

Figure 4:
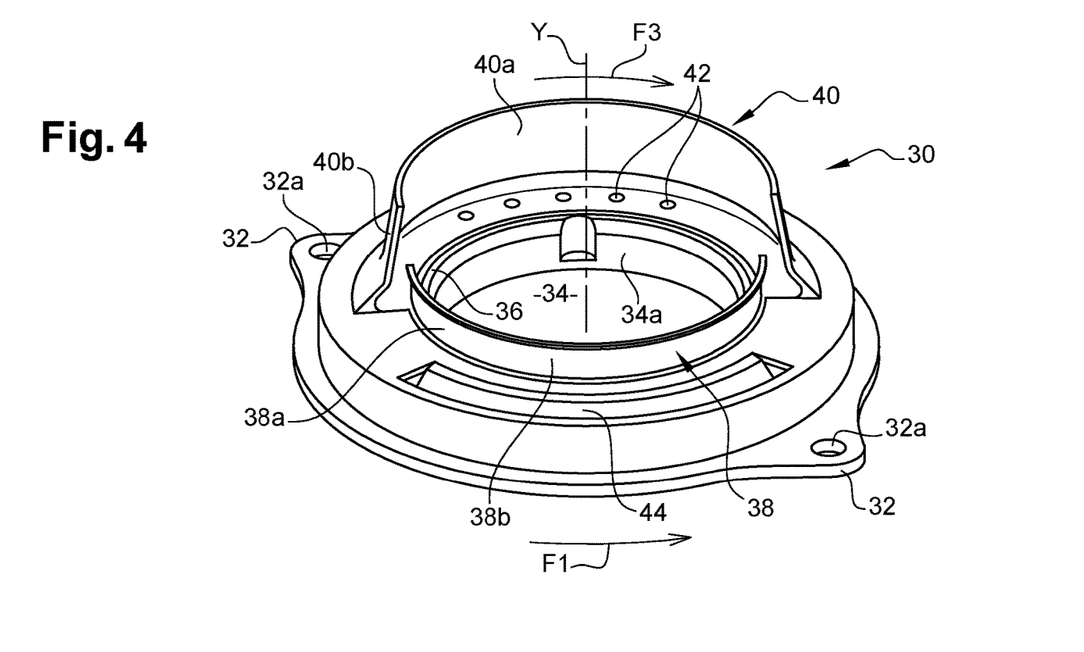
FIG. 4 is a perspective view of one of the covers in FIG. 3.
Figure 5:
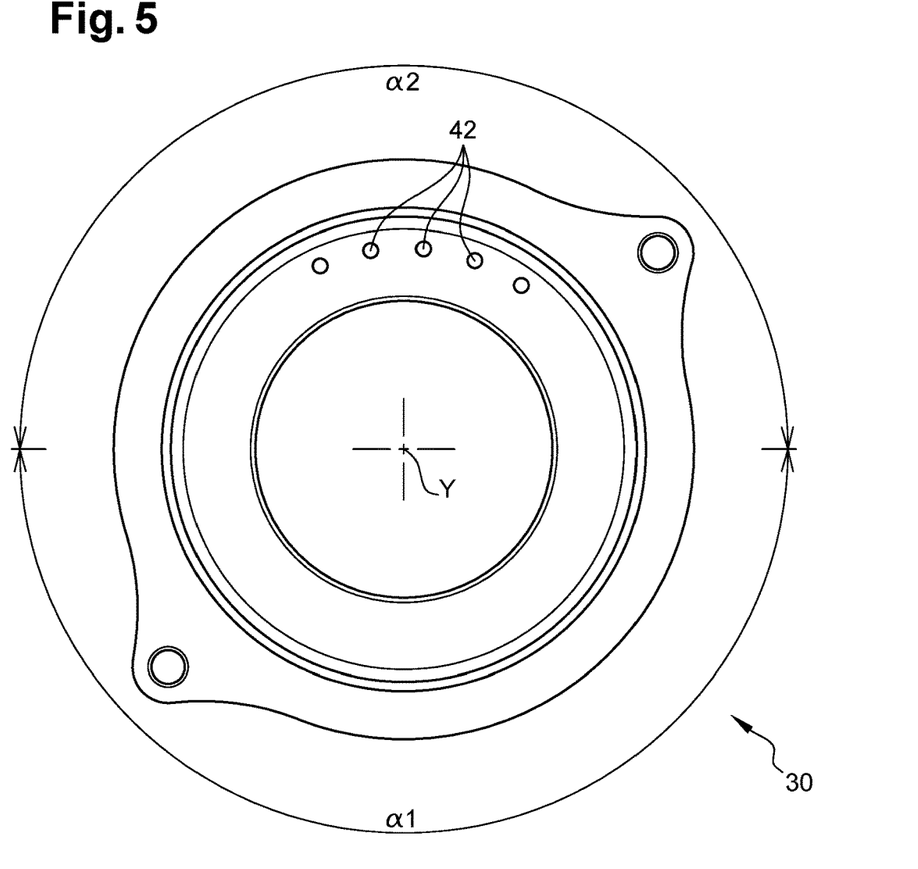
FIG. 5 is another perspective view of the cover of FIG. 4, seen from the front.
Figure 6:
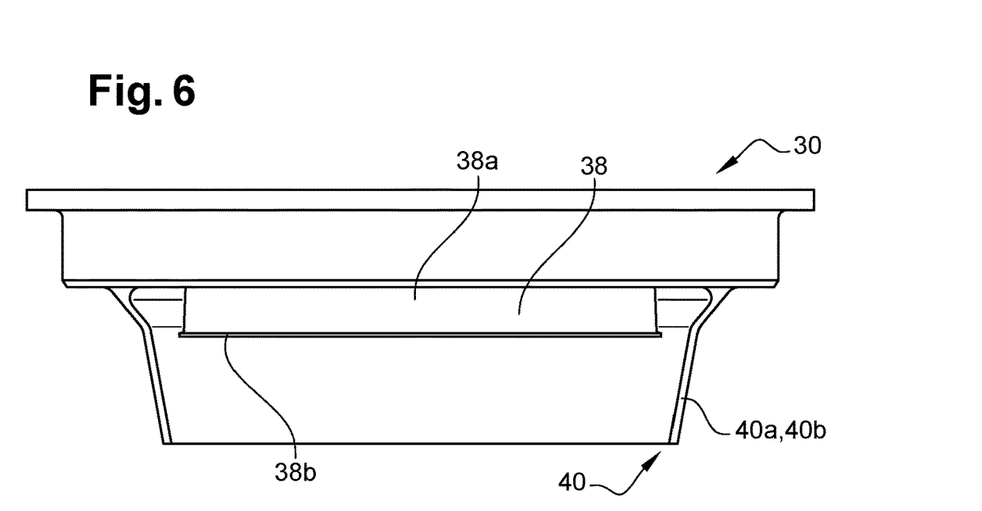
FIG. 6 is another perspective view of the cover of FIG. 4, seen from the side.

The covers 30 located at the ends of each support 10b of the planet carrier are identical and are best seen in FIGS. 4 to 6.

Each cover 30 comprises a body of generally annular shape around an axis which is the axis Y of the tubular support 10b when assembled one onto the other.

Each cover 30 comprises a radial annular flange on the outer periphery of the body or radial tabs 32 for fixing to the planet carrier 10. This flange or radial tabs 32 have screw passage orifices 32a or similar configured to be screwed into threaded holes of the planet carrier 10 or for passing through orifices in the planet carrier and receiving nuts.

Each cover 30 furthermore comprises at the inner periphery of the body a mounting orifice 34 for mounting on one end of a support 10b and in particular on an edge 10e. The orifice 34 comprises an internal cylindrical surface 34a intended to cooperate with the surface 10e1 of the support 10b for centering the cover 30 on the support 10b. The cover 30 further comprises a radial annular surface 36 at its inner periphery which is intended to be applied axially against the radial surface 20b1 of the support 10b.

The surface 34a has a diameter D1 slightly larger than the diameter of the surface 10e1. The surface 36 extends substantially between the diameter D1 and a diameter D2 greater than D1.

On a first circumference of diameter D3, greater than D2, the ring gear 31 comprises a first circumferential deflector 38.

On a second circumference of diameter D4, greater than D3, the ring gear 31 comprises a second circumferential deflector 40.

The first deflector 38 has a predetermined circumferential extent a1 around the axis Y, which is, for example, between approximately 160 and 200° (FIG. 5).

This deflector 38 has a generally flared shape on the opposite side of the body and comprises a circumferential oil guiding surface 38a, which is located radially outwards with respect to the axis Y (FIGS. 3, 4 and 6).

The deflector 38 comprises, at a free end located on the side opposite the body, a circumferential edge 38b oriented radially outwards with respect to the axis Y. Measured along the axis Y, the deflector 38 has a length L1 and its edge has a thickness E (FIG. 3). The edge 38b increases the oil holding capacity of the deflector 38.

The second deflector 40 has a predetermined circumferential extent α2 around the axis Y, which is, for example, approx. 160 to 200°.

This deflector 40 has a generally flared shape on the side of the body and comprises a circumferential oil guiding surface 40a, which is located radially inwards with respect to the axis Y.

The deflector 40 comprises, at a free end located on the opposite side of the body, a circumferential edge 40b inclined with respect to the rest of the deflector. Measured along the axis Y, the deflector 40 has a length L2 similar to L1 and its edge 40b has a length L3 which is 30 to 80% of the length L2.

With reference to FIG. 2 which shows an axial section of the support 10b and the covers 30, it can be seen that the first deflector 38 has a generally frustoconical shape or is inclined with respect to the axis Y at an angle of approximatively 20 to 50°. The second deflector 40 has a generally biconical shape and comprises a first part on the side of the body, which is inclined with respect to the axis Y at an angle in the range of approximatively 30 to 60°, and a second part on the opposite side, which is inclined with respect to the axis Y at an angle in the range of approximatively 10 to 40°. The radius of the first deflector decreases towards the median plan of the bearing, while the radius of the second deflector increases towards the median plan of the bearing. Changing the taper of the second deflector increases its oil holding capacity.

As can be seen in the drawings, the deflectors 38, 40 are approximately diametrically opposed with respect to the axis Y. Due to their circumferential extents being close to or even greater than 180°, the circumferential ends of the deflector 38 are close to (e.g., adjacent or overlapping when viewed along axis Y) those of the deflector 40, which facilitates the oil flow, as will be described in more detail in the following.

In a particular example of embodiment of the present disclosure, the circumferential ends of the deflectors are separated from each other by an angle of approximatively 5 to 10° so as to facilitate the manufacture of the cover, in particular by machining.

The cover 30 furthermore comprises oil discharge pipes 42 which pass substantially axially through the body and which are diametrically opposed with respect to the deflector 38. These pipes 42 may be slightly inclined with respect to the above-mentioned axis. These pipes 42 open axially on the side of the deflector 40, radially inside the latter with respect to the axis Y.

In the example shown, the cover 30 comprises a series of five pipes 42 which are distributed over an angular sector with a circumference of diameter D6, this diameter D6 being between D3 and D4 in the example shown (FIG. 3).

The pipes 42 have a generally cylindrical shape and extend parallel to the axis Y.

In addition, the cover 30 in the example shown comprises a circumferential oil accumulation tub 44, also known as an oil wedge. This tub 44 is diametrically opposite to the deflector 40 and opens on the side of the deflector 38, radially outside the latter.

The tub 44 has a circumferential extent around the axis Y of between 100 and 150°. It extends in the radial direction between a circumference of diameter D7 and a circumference of diameter D8, these diameters being greater than D1, D2, D3 and D6.

As can be seen in FIG. 3, in axial section, this tub 44 has a generally triangular shape with the base located radially outside and the apex located radially inside.

In the mounting position shown in FIG. 3, the covers 30 are arranged symmetrically with respect to a median plane O perpendicular to Y and passing through the center of the support 10b. The covers 30 are engaged on the edges 10e of the support 10b in such a way that the deflectors 38, 40 engage axially in the grooves 21a, 21b.

Figure 7:
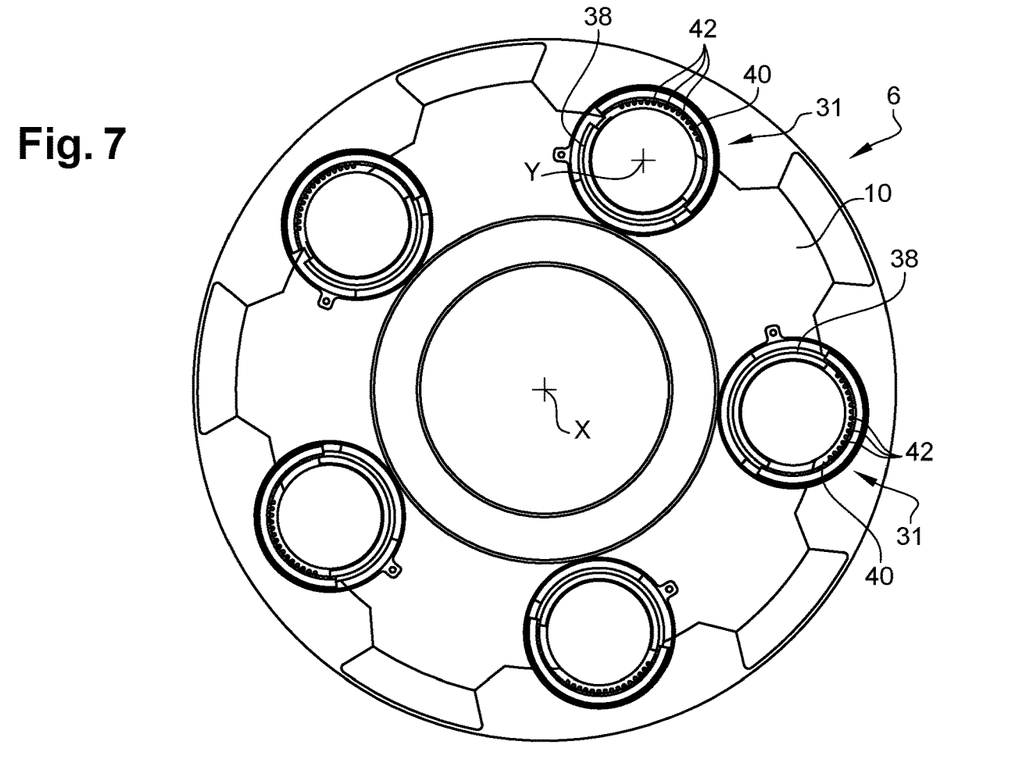
FIG. 7 is a cross-sectional view of a reduction gear provided with tubular supports and covers as shown in the FIGURE.

When all the supports 10b and their covers 30 are fixed to the planet carrier 10, the configuration shown in FIG. 7 is obtained. In the example shown, the covers are all identical and arranged identically around their axis Y and the axis X of the reduction gear. Alternatively, the covers of one reduction gear could be different, or they could be identical but arranged differently on the reduction gear. This depends, among other things, on the center of gravity of each cover and the positions of the above-mentioned oil wedges.

The directions of rotation of the planet gears 8 are indicated by the arrows F1 in FIGS. 4 and 7. The arrow F2 represents the direction of rotation of the sun gear 7 and the arrow F3 represents the direction of rotation of the planet carrier 10.

During operation, oil is injected through the distributor 13 (FIG. 2) into the cavities 10c of the supports 10b and flows to the grooves 23 through the pipes 10d, so that oil films are formed between the supports 10b and their planet gears 8. This oil tends to flow on the sides of the supports 10b into the grooves 21a, 21b. The deflectors 38 are located on the side of the axis X of rotation of the planet carrier 10 and the oil in the groove 21a tends in the deflector location area to accumulate in the tubs 44 and then to flow onto the surfaces 38a of the deflectors under the effect of centrifugal forces. This oil flows circumferentially from the tub 44 to the circumferential ends of the deflectors 38 where it then flows to the deflectors 40 and is guided by the surfaces 40a of these deflectors 40 to the pipes 42. The oil then flows through these pipes 42 to be drained to the outside and preferably recycled.

Figure 8:
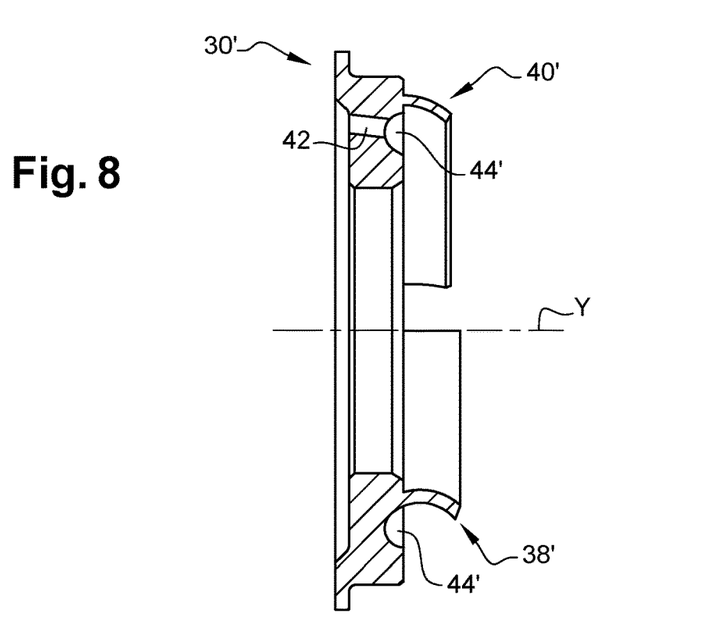
FIG. 8 is an axial cross-sectional of a cover according to an alternative representative embodiment of the present disclosure.
Figure 9:
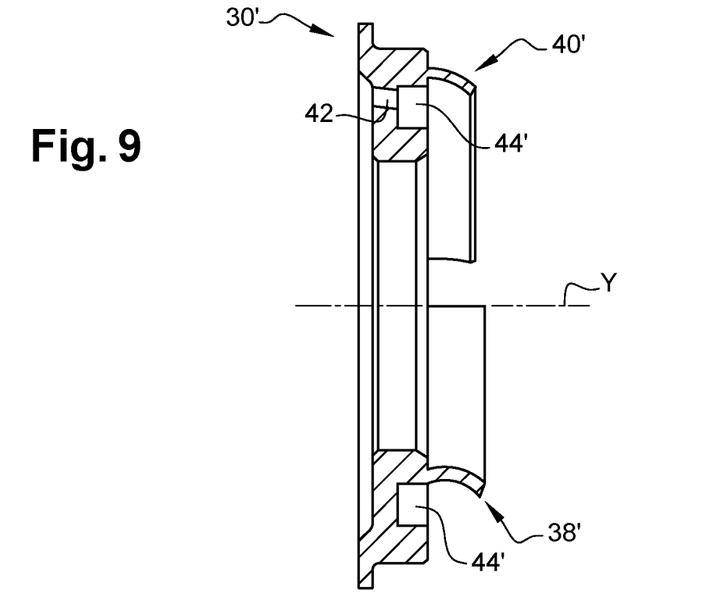
FIG. 9 is an axial cross-sectional of a cover according to another alternative representative embodiment of the present disclosure.

The alternative embodiments in FIGS. 8 and 9 show on the one hand that the deflectors 38', 40' of the cover 30' are not necessarily frustoconical. The deflector 38' has a generally curved cross-section with the concavity oriented radially outwards with respect to the axis Y. The deflector 40' has a generally curved cross-section with the concavity oriented radially inward with respect to the axis Y. On the other hand, the tub 44 has a generally circular or rounded cross-sectional shape in FIG. 8 and a generally rectangular shape in FIG. 9. In each of the alternative embodiments of FIGS. 8 and 9, the tub 44 has a circumferential extent of 360° around the axis Y.

Figure 10:
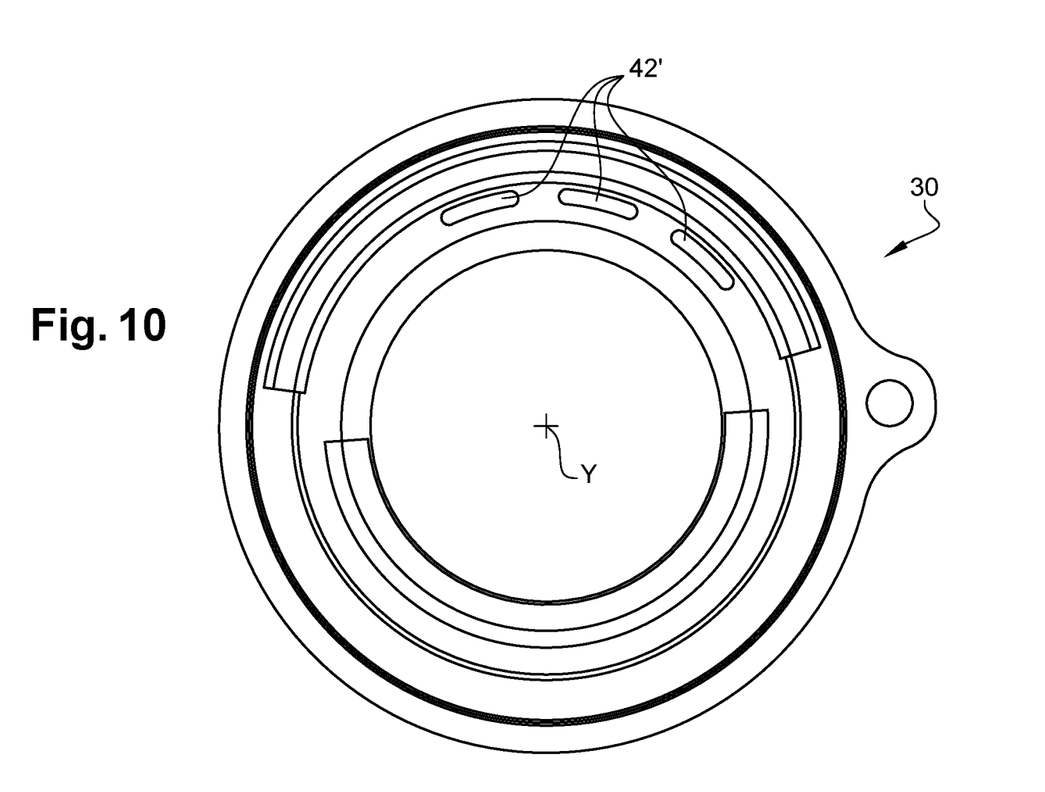
FIG. 10 is a front view of a cover according to an alternative embodiment of the present disclosure.

FIG. 10 shows an alternative embodiment of a cover 30 in which the pipes 42' have a generally elongated shape in the circumferential direction around the axis Y, the so-called "porthole."

The gains brought by this present disclosure include, for example:
  global cooling of the components of the reduction gear,
  increase in the seizure margin between the ring gear and planet gears and between the planet gears and sun gear,
  approximately 10% less friction loss of the bearing (lower oil temperature),
  possible reduction of the length of the toothing of the ring gear and the planet gear,
  lower oil flow rate,
  better evacuation of calories,
  possible reduction of the length of the tubular supports of the bearings and planet gears,
  possible reduction of the risk of contact between the planet gears and these supports.

The detailed description set forth above in connection with the appended drawings, where like numerals reference like elements, are intended as a description of various embodiments of the present disclosure and are not intended to represent the only embodiments. Each embodiment described in this disclosure is provided as an example or illustration and should not be construed as preferred or advantageous over other embodiments. The illustrative examples provided herein are not intended to be exhaustive or to limit the disclosure to the precise forms disclosed. Similarly, any steps described herein may be interchangeable with other steps, or combinations of steps, in order to achieve the same or substantially similar result.

Generally, the embodiments disclosed herein are non-limiting, and the inventors contemplate that other embodiments within the scope of this disclosure may include structures and functionalities from more than one specific embodiment shown in the FIGURES and described in the specification. It will be appreciated that variations and changes may be made by others, and equivalents employed, without departing from the spirit of the present disclosure. Accordingly, it is expressly intended that all such variations, changes, and equivalents fall within the spirit and scope of the present disclosure as claimed. For example, the present disclosure includes additional embodiments having combinations of any one or more features described above with respect to the representative embodiments.

In the foregoing description, specific details are set forth to provide a thorough understanding of representative embodiments of the present disclosure. It will be apparent to one skilled in the art, however, that the embodiments disclosed herein may be practiced without embodying all the specific details. In some instances, well-known process steps have not been described in detail in order not to unnecessarily obscure various aspects of the present disclosure.

The present application may include references to directions, such as "first," "second," "vertical," "horizontal," "front," "rear," "left," "right," "top," and "bottom," etc. These references, and other similar references in the present application, are intended to assist in helping describe and understand the particular embodiment (such as when the embodiment is positioned for use) and are not intended to limit the present disclosure to these directions or locations.

The present application may also reference quantities and numbers. Unless specifically stated, such quantities and numbers are not to be considered restrictive, but exemplary of the possible quantities or numbers associated with the present application. Also in this regard, the present application may use the term "plurality" to reference a quantity or number. In this regard, the term "plurality" is meant to be any number that is more than one, for example, two, three, four, five, etc. The term "about," "approximately," etc., means plus or minus 5% of the stated value. The term "based upon" means "based at least partially upon."

The embodiments of the invention in which an exclusive property or privilege is claimed are defined as follows:

1. An oil pipe cover for a reduction gear of an aircraft turbomachine, the oil pipe cover being configured to be fixed to a planet carrier of the reduction gear and to be mounted on an axial end of a tubular support for a hydrodynamic bearing of a planet gear of the reduction gear, the oil pipe cover comprising an annular body extending around an axis (Y) and comprising a mounting central orifice on the axial end, wherein the annular body comprises:
   a first circumferential deflector having a first circumferential extent ($\alpha 1$) around the axis (Y), the first circumferential deflector comprising a circumferential oil guiding surface (38a) located radially outwards with respect to the axis (Y);
   a second circumferential deflector having a second circumferential extent around the axis (Y), the second circumferential deflector comprising a circumferential oil guiding surface located radially inwards with respect to the axis (Y), the first and second circumferential deflectors being diametrically opposed with respect to the axis (Y); and
   oil discharge pipes which pass substantially axially through the annular body and which are diametrically opposed with respect to the first circumferential deflector, the oil discharge pipes opening axially on a side of the second circumferential deflector, radially inside the second circumferential deflector with respect to the axis (Y).

2. The oil pipe cover according to claim 1, wherein each of the first and second circumferential extents ($\alpha 1$, $\alpha 2$) is between 160° and 360°.

3. The oil pipe cover according to claim 1, wherein the first circumferential deflector comprises circumferential ends close to the circumferential ends of the second circumferential deflector, so that oil flowing on the circumferential oil guiding surface of the first circumferential deflector can then flow on the circumferential oil guiding surface of the second circumferential deflector.

4. The oil pipe cover according to claim 1, wherein at least one of the first circumferential deflector has a flared shape on a first side opposite to the annular body or the second circumferential deflector has a flared shape on a second side of the annular body.

5. The oil pipe cover according to claim 1, wherein the first circumferential deflector comprises, at a free end located on a side opposite to the annular body, a circumferential edge oriented radially outwards with respect to the axis (Y).

6. The oil pipe cover according to claim 1, wherein the annular body comprises an oil accumulating circumferential tub being diametrically opposed with respect to the second circumferential deflector and opening on a side of the first circumferential deflector, radially outside the first circumferential deflector.

7. The oil pipe cover according to claim 6, wherein the oil accumulating circumferential tub has circumferential extents around the axis (Y) which are less than or equal to 360°.

8. The oil pipe cover according to claim 6, wherein the oil accumulating circumferential tub has in axial section a triangular or rectangular or circular shape, a base of which is located radially outside and an apex of which is located radially inside, with respect to the axis (Y).

9. The oil pipe cover according to claim 1, wherein the second circumferential deflector comprises, at a free end located on a side opposite to the annular body, a circumferential edge oriented on the side opposite to the annular body.

10. The oil pipe cover according to claim 1, wherein the first and second circumferential deflectors and the oil discharge pipes are formed in a single piece.

11. A reduction gear for an aircraft turbomachine, the reduction gear comprising:
   a sun gear having the axis of rotation (X);
   a ring gear which extends around the sun gear and which is configured to be immobile in rotation around the axis of rotation (X);
   planet gears which are meshed with the sun gear and the ring gear and which are held by a planet carrier which is configured to be rotatable around the axis (X), each of the planet gears being guided in rotation by a hydrodynamic bearing comprising a tubular support around which the planet gear is rotatably mounted, each of the tubular supports comprising a first annular groove located at a first axial end of the tubular support, and a second annular groove located at a second opposite end of the tubular support, the first and second annular grooves being oriented axially in opposite directions; and
   a lubricating oil distributor which is configured to supply oil to internal cavities of the tubular supports, each of the tubular supports comprising oil conveying pipes from its internal cavity to its outer periphery for forming an oil film between the tubular support and the planet gear,
   wherein each of the tubular supports is fixed to the planet carrier via two of the oil pipe covers according to claim 1, which are respectively and coaxially mounted on first and second axial ends of the tubular support, the oil pipe cover mounted on the first axial end of the tubular support having its deflectors which are axially engaged in the first annular groove, and the oil pipe cover mounted on the second axial end of the tubular support having its deflectors which are axially engaged in the second annular groove.

12. The reduction gear according to claim 11, wherein oil discharge pipes of the oil pipe covers open axially on the side of the second circumferential deflector, at the first or second annular groove of the tubular support.

13. The reduction gear according to claim 11, wherein the oil conveying pipes are substantially located in a same plane passing through the axis (Y), and the same plane passes substantially at a level of the oil discharge pipes.

14. The reduction gear according to claim 13, wherein the oil conveying pipes open into a same annular groove formed in an external cylindrical surface of the tubular support.

15. An aircraft turbomachine comprising the reduction gear according to claim 11.

* * * * *